United States Patent [19]

James

[11] Patent Number: 4,681,137
[45] Date of Patent: Jul. 21, 1987

[54] REACTION INJECTION MOLDING PRESSURE DEVELOPING AND BALANCING CIRCUIT

[75] Inventor: James R. James, Clarksville, Ind.

[73] Assignee: Accuratio System Inc., Clarksville, Ind.

[21] Appl. No.: 861,634

[22] Filed: May 7, 1986

Related U.S. Application Data

[63] Continuation of Ser. No. 281,401, Jul. 8, 1981, abandoned.

[51] Int. Cl.$^4$ .............................................. B29C 45/00
[52] U.S. Cl. .................................. 137/568; 137/563
[58] Field of Search ............... 137/206, 209, 503, 563, 137/565, 568, 569; 222/335, 340; 138/30, 31

[56] References Cited

U.S. PATENT DOCUMENTS

| | | | |
|---|---|---|---|
| 2,752,075 | 6/1956 | Hill | 222/335 X |
| 2,775,255 | 12/1956 | Snyder | 138/31 X |
| 2,877,929 | 3/1959 | Ireland | 137/563 X |
| 3,285,272 | 11/1966 | Messenger | 137/563 X |
| 3,406,682 | 10/1968 | Engstrom | 137/624.14 |
| 3,570,524 | 3/1971 | Dellasaka | 137/563 X |
| 4,096,875 | 6/1978 | Jones | 137/624.14 X |
| 4,105,045 | 8/1978 | Althausen | 137/563 |
| 4,119,110 | 10/1978 | Stone | 137/563 X |

*Primary Examiner*—Alan Cohan
*Attorney, Agent, or Firm*—Lloyd M. Forster

[57] ABSTRACT

A pressure developing and balancing circuit for use with chopped glass fibers in reaction injection molding eliminating high pressure drop valving of glass filled liquid component materials which normally create serious heating and valve erosion wear problems.

7 Claims, 2 Drawing Figures

REACTION INJECTION MOLDING PRESSURE DEVELOPING AND BALANCING CIRCUIT

This is a continuation of co-pending application Ser. No. 281,401 filed on July 8, 1981 now abandoned.

BACKGROUND OF THE INVENTION

Prior art reaction injection molding (RIM) process involves high pressure impingement of multi-component materials, such as urethanes, epoxys, silicone, polyesters, and phenolics, in a liquid form which react within the mold to form solid plastic products. In order to strengthen such products chopped glass fibers may be introduced into one or both reactant liquid components which tend to produce inherent serious wear problems in any valving which involves a high pressure drop over restricted passages in opening or closing a valve port or in metering high velocity flow with abrasion of glass fibers on restricted valve surfaces. Also pressurized flow through restricted valve ports causes heating of the materials with attendant changes in viscosity, flow rates and accuracy of injection charge, both as to quantity and ratio, required for optimum molded product results.

In a prior art pressure developing circuit which did not involve the use of chopped glass fiber reinforcement, a general recirculating system is pressurized by the closing of bypass valves following which flow produced by hydraulic metering cylinders establish high mixing head pressures against pressure developing balance valves in parallel with the closed bypass valves at which time the chemicals flowing through the pressure balance valves generate adverse high temperature effects. In order to partially alleviate such heating and shorten the time for pressure buildup "dead head" valves have been installed just after the mixing heads which block flow from metering cylinders delivering material to the system and cause required injection pressures to build quickly in the system. When line pressure in each half of the total system reaches the correct level, its dead head valve opens with high pressure maintained by its restricted pressure balance valve for a brief time delay after both dead head valves have opened. Mixing head valves are then opened simultaneously to start the timed mixing cycle during which flow is completely diverted through the mixing heads. Flow through the pressure balance valves during dead head buildup to operating pressure is thereby avoided and time and heating effects are reduced. However, temporary flow through the pressure balance valves after dead head opening and before mixing continues to provide undesired material heating effects; also, such valves continue subject to erosion problems incident to chopped glass fibers.

SUMMARY OF THE PRESENT INVENTION

The circuit of the present invention adds an extra cylinder for each half of the system that acts as a receiver for the chopped glass slurry during pressure buildup. With dead head valves closed and metering cylinders driving forward the filled material is forced into one side of the extra pressure balance cylinder the other side of which is filled with dioctyl phthalate (D.O.P.) which must exit through a pressure developing regulator counter balance valve. In this manner the D.O.P. is subjected to the high shear high heat conditions and not the glass filled resin.

DETAILED DESCRIPTION OF THE DRAWINGS

Figure 1:
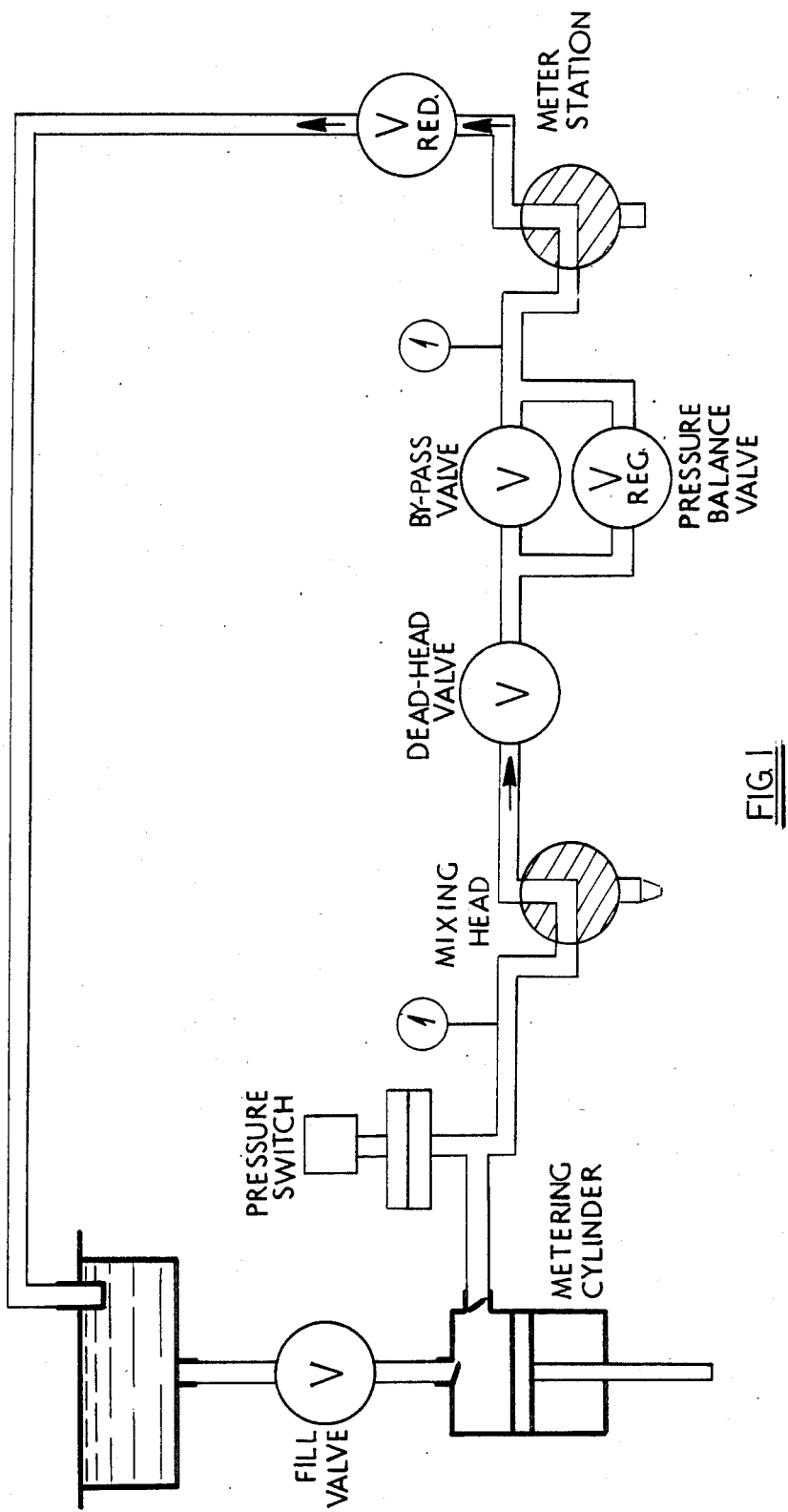
FIG. 1 is a schematic diagram illustrating a first prior art pressure balancing and pressure developing circuit with low pressure metering station.

Referring to FIG. 1 the schematically illustrated prior art pressure developing circuit represents half of a total system for delivering two reactant liquids to mixing heads where orifice discharges impinge, to effect a thorough mixing immediately preceding injection into the mold where chemical reaction takes place to effect a setting of the plastic materials in any given product form, known in the art as reaction injection molding or RIM process. A three-way valve for each component at its mixing head, when actuated, introduces the liquid component under high pressure through a nozzle causing a fine spray dispersion with opposing nozzles creating a mixing turbulence. The object of the pressure developing circuit is to provide an adequate high pressure at the discharge nozzle at the beginning and throughout injection cycle to assure controlled delivery and thorough mixing of a predetermined volume or weight of each component material, including an accurate ratio, as required to produce optimum chemical reaction and ultimate product quality.

With reference to the designated elements, as a preliminary to the molding cycle in order to condition the material temperature, or during dwell periods in production, the BY-PASS VALVE may be opened providing low pressure recirculation through the V RED. valve which may be adjusted to establish a pressure in the order of 100 p.s.i. In such case the FILL VALVE will be opened by air or hydraulic actuation to fill the METERING CYLINDER driven by hydraulic pump/motor (not shown) to reciprocate and thereby pump material past the MIXING HEAD through the DEAD HEAD and BY-PASS VALVES past the METERING STATION and through the V RED. valve for return to the MATERIAL TANK. When the material has been temperature conditioned and production is to begin or resume the BY-PASS VALVE and DEAD HEAD VALVE are closed causing rapid buildup of required pressure at the MIXING HEAD, e.g. in the order of 2000/2200 p.s.i., at which time the PRESSURE SWITCH opens the DEAD HEAD VALVE and high pressure is maintained by restricted flow through the PRESSURE BALANCE VALVE for a brief time delay after both DEAD HEAD VALVES have opened.

A three-way valve at each MIXING HEAD leading to a nozzle will then be opened simultaneously for discharge beginning a timed mixing cycle during which flow will be completely diverted through the MIXING HEAD, pressure beyond the MIXING HEAD will drop and the DEAD HEAD VALVE will close. The METERING CYLINDER will continue its stroke delevering material to the MIXING HEAD throughout at least a single complete mixing cycle at which time the MIXING HEAD valve will close to the nozzle and the METERING CYLINDER will either continue rebuilding pressure against the DEAD HEAD VALVE for another new piece injection shot or return for refill preparatory to the next mixing cycle. To the extent that flow occurs through the PRESSURE BALANCE VALVE the material will be heated.

A low pressure METERING STATION is provided for periodically testing the volume or weight of component material delivered by the METERING CYLINDER with the MIXING HEAD closed so that it may be compared with the discharge from the other material component circuit in order to verify the accuracy of material ratio delivered to the respective MIXING HEADS. The METERING STATION for checking delivery rate and ratio is manually actuated whenever test readings are desired during a closed condition of the MIXING HEAD, an open DEAD HEAD VALVE and a closed BY-PASS VALVE causing all flow to pass through the PRESSURE BALANCE VALVE which together with the V RED. valve create a low pressure metering to sample containers for weight or volume comparison of flow during a predetermined fixed period of time.

The prior art system described above is not only subject to problems of material heating across the PRESSURE BALANCE VALVE but, in the case of reinforcing glass fibers in the material, is subject to a further more serious problem of PRESSURE BALANCE VALVE erosion from the abrasive glass fibers passing through narrow restrictions required to maintain operating back pressure prior to MIXING HEAD opening and during METERING STATION operation.

Figure 2:
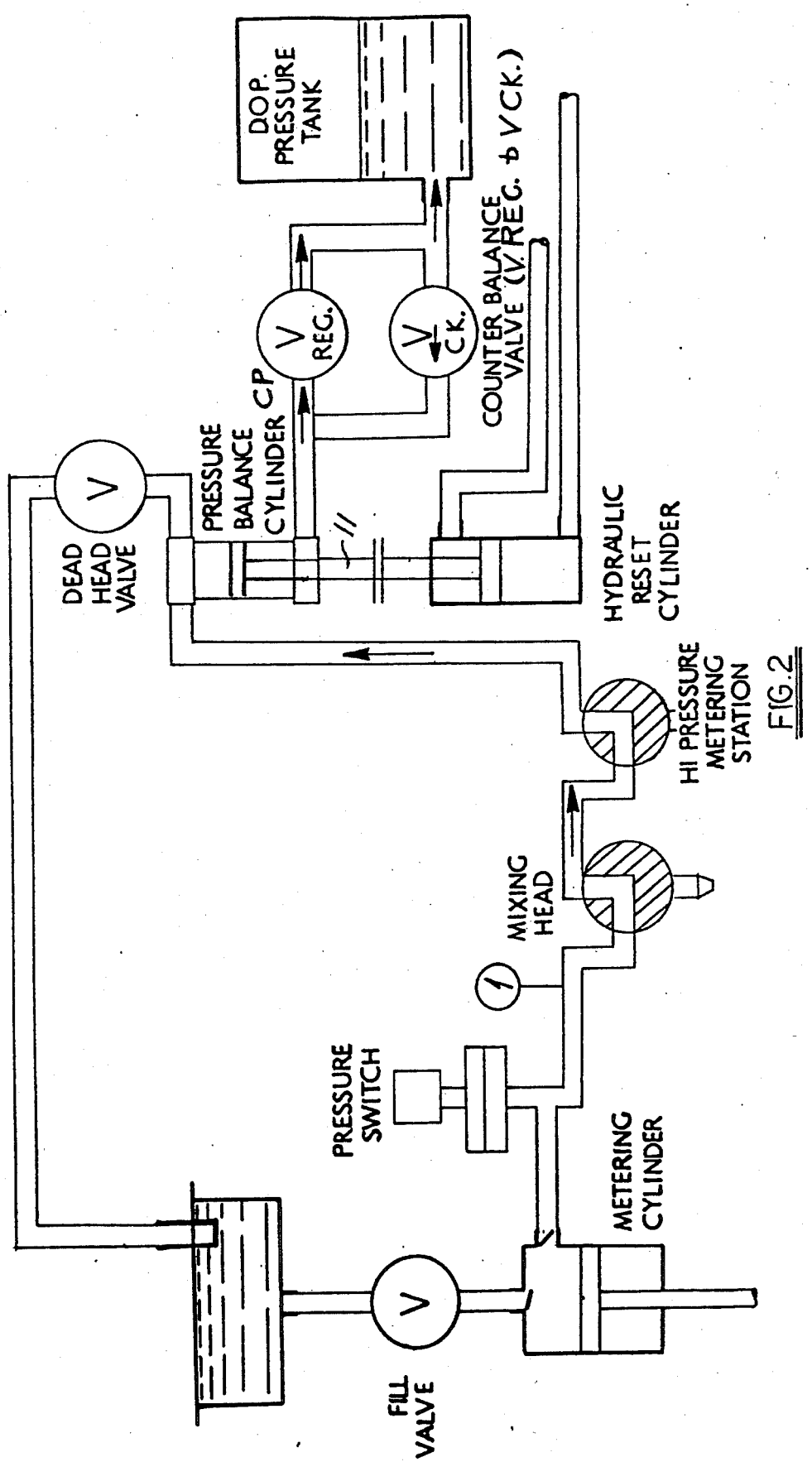
FIG. 2 is a schematic diagram illustrating the improved pressure balance circuit for use with chopped fibers forming the subject matter of the present invention.

With reference to FIG. 2, the problems of material heating and PRESSURE BALANCE VALVE erosion are overcome by the addition of a PRESSURE BALANCE CYLINDER coupled with an auxiliary PRESSURE TANK and pressure regulating COUNTERBALANCE VALVE circuit. In this case the PRESSURE BALANCE CYLINDER is fed at one end with reactant material which actuates a piston having dioctyl phthalate (D.O.P.) or equivalent mineral oil on its other side leading to the COUNTERBALANCE VALVE which may be set for an operating inlet V REG. opening pressure in the order of 2000/2200 p.s.i. so that any flow of reactant material during pressure buildup will pass unrestricted into the one end of the PRESSURE BALANCE CYLINDER while the D.O.P. at the other end will pass through the restricted V REG. pressure regulating inlet of the COUNTERBALANCE VALVE and store the resulting D.O.P. flow in the PRESSURE TANK which is half filled with air or nitrogen having a pressure in the order of 100/150 p.s.i. Upon both sides reaching required pressure and passage of a brief time delay, each MIXING HEAD will simultaneously divert complete flow to its mixing nozzle unloading the PRESSURE BALANCE CYLINDER to permit the D.O.P. PRESSURE TANK to return D.O.P. flow through the one-way V CK. check valve of the COUNTERBALANCE VALVE restoring the PRESSURE BALANCE CYLINDER to its starting position with the HYDRAULIC RESET CYLINDER assuring full return if the D.O.P. pressure through the "V CK." check valve fails to complete the return piston stroke of the PRESSURE BALANCE CYLINDER. At the completion of one or more mixing cycles retraction of the METERING CYLINDER will permit refilling for further operation. Thus, any heating from high pressure flow across valve restrictions is confined to the D.O.P. and is absorbed in the PRESSURE TANK while the pressure regulating restrictions of the COUNTERBALANCE VALVE are free of any abrasive eroding effects from chopped glass fibers in the reactant material.

The DEAD HEAD VALVE remains closed during such operation opening only under emergency pressures, e.g. in the order of 3000 p.s.i. or during warm up or dwell periods when the MIXING HEAD is not operating. The HI PRESSURE METERING STATION having orifice discharge comparable to the mixing head may be employed with the DEAD HEAD VALVE and MIXING HEAD closed to collect respective samples and verify delivery and ratio of the respective materials under high pressure mixing values. As an alternative an encoder driven by the piston rod 11 may be employed for measuring material delivery and ratio before starting the production cycle, comparative encoder values on each material circuit providing relative ratio values.

With this system there is no heating of the reactant material which is not subject to flow through any restrictive valve, all liquid heating being absorbed in the D.O.P. circuit which has no effect on reactant material temperatures. Also, as stated above the reactant material circuit is free of restrictive valve passages which might be subject to erosion under passage of the chopped fibers slurry. Thus, with the improved system of the present invention the problems of material heating and PRESSURE BALANCE VALVE erosion from chopped fibers have been eliminated.

I claim:

1. Pressure developing and balancing circuit means for reaction injection molding comprising a reactant liquid reservoir, means for highly pressurizing reactant liquid supplied from said reservoir, mixing head means, pressure balance cylinder means, pressure regulating counterbalance valve means, accumulator means, circuit means for conducting said reactant liquid through relatively unrestricted passages to and past said mixing head means and to tone end of said pressure balance cylinder means, displaceable pressure transmitting means within said pressure balance cylinder means for separating liquids at the respective ends of said cylinder means, circuit means for conducting a non-reactant liquid from the other end of said pressure balance cylinder means to said accumulator means through regulating valve means restrictions in said counterbalance valve means responsive to upstream pressure for maintaining a high pressure in said other end of the pressure balance cylinder whereby an upstream regulated high pressure head may be maintained on said reactant liquid at said one end of said pressure balance cylinder means and back through said unrestricted passages at said mixing head without said reactant liquid passing through a resstrictive valve.

2. The circuit means of claim 1 including a one-way check valve element in said counterbalance valve means admitting return flow of said non-reactant liquid to said other end of said pressure balance cylinder means upon release of pressure at said first end of said pressure balance cylinder means.

3. The circuit means of claim 2 including reset cylinder means for fully restoring said pressure balance cylinder means to its initial condition for receiving reactant liquid.

4. The circuit means of claim 1 including return passage means from said one end of said pressure balance cylinder means to said reservoir and valve means for blocking said return passage during mixing operations.

5. The circuit means of claim 1 including high pressure metering station means interposed between said mixing head means and said pressure balance cylinder means for testing pressurized reactant liquid when said mixing head means is closed.

6. The circuit means of claim 1 including encoder means responsive to fluid displacement in said pressure balance cylinder means for measuring pressurized reactant liquid flow while said mixing head is closed.

7. The circuit means of claim 1 wherein said means for pressurizing include reciprocable metering cylinder means.

* * * * *